US008130051B2

(12) United States Patent
Vavelidis et al.

(10) Patent No.: US 8,130,051 B2
(45) Date of Patent: Mar. 6, 2012

(54) METHOD AND SYSTEM FOR VARACTOR LINEARIZATION

(75) Inventors: Konstantinos Dimitrios Vavelidis, Ilioupolis (GR); Theodoros Georgantas, Chaidari (GR); Sofoklis Emmanouel Plevridis, Glyfada (GR)

(73) Assignee: Broadcom Corporation, Irvine, CA (US)

( * ) Notice: Subject to any disclaimer, the term of this patent is extended or adjusted under 35 U.S.C. 154(b) by 311 days.

(21) Appl. No.: 12/026,661

(22) Filed: Feb. 6, 2008

(65) Prior Publication Data

US 2009/0195958 A1    Aug. 6, 2009

(51) Int. Cl.
    *H03B 5/12*    (2006.01)
(52) U.S. Cl. ............... 331/177 V; 331/117 FE; 331/179
(58) Field of Classification Search ............ 331/117 FE, 331/177 V; 257/595, 596
    See application file for complete search history.

(56) References Cited

U.S. PATENT DOCUMENTS

| 6,100,770 | A | * | 8/2000 | Litwin et al. ............ 331/117 FE |
| 6,608,747 | B1 | * | 8/2003 | Ito ................................. 361/277 |
| 6,621,362 | B2 | * | 9/2003 | Momtaz et al. ............ 331/117 R |
| 6,794,707 | B1 | * | 9/2004 | Cao ................................. 257/312 |
| 7,133,485 | B1 | * | 11/2006 | Baird et al. ..................... 375/376 |
| 7,221,234 | B2 | * | 5/2007 | Chien ........................ 331/177 V |
| 2002/0014925 | A1 | * | 2/2002 | Ochiai ..................... 331/117 FE |
| 2003/0136992 | A1 | * | 7/2003 | Adan ............................. 257/300 |
| 2007/0057743 | A1 | * | 3/2007 | Vancorenland et al. .. 331/177 V |

* cited by examiner

*Primary Examiner* — Joseph Chang
*Assistant Examiner* — Jeffrey Shin
(74) *Attorney, Agent, or Firm* — Sterne, Kessler, Goldstein & Fox P.L.L.C.

(57) ABSTRACT

Aspects of a method and system for varactor linearization are provided. In this regard, a relationship between control voltage and capacitance of a variable capacitor may be controlled utilizing a plurality of bias voltages communicatively coupled to a corresponding plurality of bias terminals of said variable capacitor. The variable capacitor may comprise a plurality of two-terminal unit varactors and a first terminal of each unit varactor may be coupled to an RF terminal of the variable capacitor, a second terminal of one of the unit varactors may be coupled to the control voltage, and a second terminal of each of the remaining unit varactors may be coupled to one of the bias voltages. The bias voltages may be generated via a resistor ladder and/or via the resistive nature of a portion of semiconductor substrate. The bias voltages may linearize the relationship between the control voltage and the capacitance.

14 Claims, 10 Drawing Sheets

METHOD AND SYSTEM FOR VARACTOR LINEARIZATION

CROSS-REFERENCE TO RELATED APPLICATIONS/INCORPORATION BY REFERENCE

Not Applicable

FIELD OF THE INVENTION

Certain embodiments of the invention relate to electronic circuits. More specifically, certain embodiments of the invention relate to a method and system for varactor linearization.

BACKGROUND OF THE INVENTION

Increased functionality in a smaller package is a primary goal for just about any electronic device. Accordingly, electronics and electronic fabrication technologies are constantly being pushed to the limits in order to get faster and more powerful electronic devices into smaller and smaller packages. In this regard, increasing functionality of an electronic device often means building in some sort configurability to allow a device to adapt for different functions, conditions, etc.

For example, communication devices (e.g., cell phones) often need to operate over a relatively wide range of frequencies but tuned elements/circuitry in the devices are often only suitable for a narrow range of frequencies. Accordingly, to cover a frequency band of interest, a device could employ multiple circuits in parallel and select which circuit to use based on a frequency of operation. However, multiple and/or redundant elements/circuitry results in increased cost, increased die size and increased parasitic elements, such as capacitors and resistors, that degrade circuit performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for varactor linearization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2B FIG. 3B is a diagram of an exemplary VCO utilizing linearized varactors, in accordance with an embodiment of the invention.

DETAILED DESCRIPTION OF THE INVENTION

Certain embodiments of the invention may be found in a method and system for varactor linearization. In this regard, a relationship between control voltage and capacitance of a variable capacitor may be controlled utilizing a plurality of bias voltages communicatively coupled to a corresponding plurality of bias terminals of said variable capacitor. The variable capacitor may comprise a plurality of two-terminal unit varactors and a first terminal of each unit varactor may be coupled to an RF terminal of the variable capacitor, a second terminal of one of the unit varactors may be coupled to the control voltage, and a second terminal of each of the remaining unit varactors may be coupled to one of the bias voltages. In an exemplary embodiment of the invention, the variable capacitor may comprise a control terminal, an RF terminal, and two of said bias terminals. The bias voltages may be generated via a resistor ladder and/or via the resistive nature of a portion of semiconductor substrate. In an exemplary embodiment of the invention, a portion of the bias voltages may be less than the control voltage and another portion of the bias voltages may be greater than the bias voltage. The bias voltages may linearize the relationship between the control voltage and the capacitance.

Figure 1:
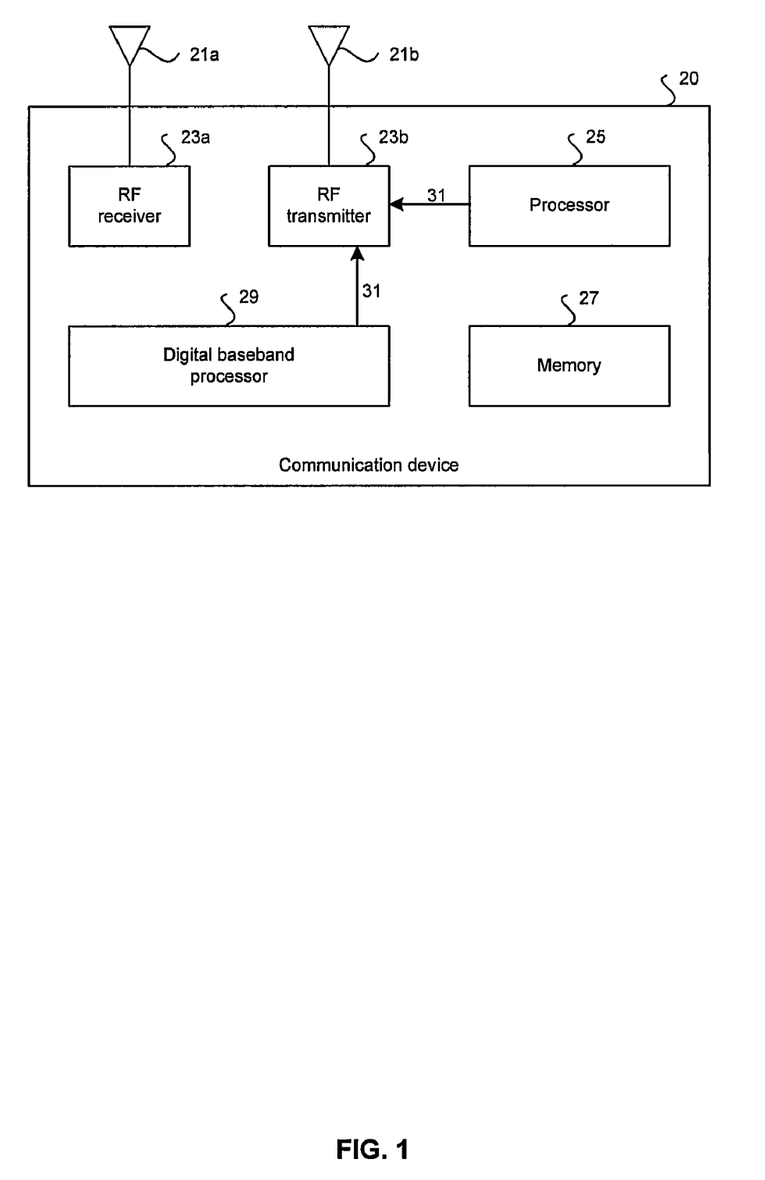
FIG. 1 is a block diagram illustrating an exemplary RF communication device, in accordance with an embodiment of the invention.

FIG. 1 is a block diagram illustrating an exemplary RF communication device, in accordance with an embodiment of the invention. Referring to FIG. 1, there is shown a RF communication device 20 that may comprise an RF receiver 23a, an RF transmitter 23b, a digital baseband processor 29, a processor 25, and a memory 27. A receive antenna 21a may be communicatively coupled to the RF receiver 23a. A transmit antenna 21b may be communicatively coupled to the RF transmitter 23b. The RF communication device 20 may be operated in a system, such as a cellular network and/or digital video broadcast network, for example.

The RF receiver 23a may comprise suitable logic, circuitry, and/or code that may enable processing of received RF signals. The receiver may be enabled to generate signals, such as local oscillator signals, for the reception and processing of RF signals. In this regard, the receiver may comprise one or more PLLs such as the PLL 100 as described with respect to FIG. 2. The RF receiver 23a may down-convert received RF signals to a baseband frequency signal. The RF receiver 23a may perform direct down-conversion of the received RF signal to a baseband frequency signal, for example. In some instances, the RF receiver 23a may enable analog-to-digital conversion of the baseband signal components before transferring the components to the digital baseband processor 29. In other instances, the RF receiver 23a may transfer the baseband signal components in analog form.

The digital baseband processor 29 may comprise suitable logic, circuitry, and/or code that may enable processing and/or or handling of baseband frequency signals. In this regard, the digital baseband processor 29 may process or handle signals received from the RF receiver 23a and/or signals to be transferred to the RF transmitter 23b. The digital baseband processor 29 may also provide control and/or feedback information to the RF receiver 23a and to the RF transmitter 23b based on information from the processed signals. In this regard, the baseband processor 29 may provide one or more control signals 31 to configure/control a PLL, such as the PLL 100 as described with respect to FIG. 2, residing in the RF receiver 23a and/or the RF transmitter 23b. The digital baseband processor 29 may communicate information and/or data from the processed signals to the processor 25 and/or to the memory 27. Moreover, the digital baseband processor 29 may receive information from the processor 25 and/or to the memory 27, which may be processed and transferred to the RF transmitter 23b for transmission to the network.

The RF transmitter 23b may comprise suitable logic, circuitry, and/or code that may enable processing of RF signals for transmission. The transmitter may be enabled to generate signals, such as local oscillator signals, for the transmission and processing of RF signals. In this regard, the receiver may comprise one or more PLLs such as the PLL 100 as described with respect to FIG. 2. The RF transmitter 23b may up-convert the baseband frequency signal to an RF signal. In some instances, the RF transmitter 23b may enable digital-to-analog conversion of the baseband signal components received from the digital baseband processor 29 before up conversion. In other instances, the RF transmitter 23b may receive baseband signal components in analog form.

The processor 25 may comprise suitable logic, circuitry, and/or code that may enable control and/or data processing operations for the RF communication device 20. The processor 25 may be utilized to control at least a portion of the RF receiver 23a, the RF transmitter 623b, the digital baseband processor 29, and/or the memory 27. In this regard, the processor 25 may generate at least one signal for controlling operations within the RF communication device 20. For example, the processor 25 may provide one or more control signals 31 to configure/control a PLL, such as the PLL 100 as described with respect to FIG. 2, residing in the RF receiver 23a and/or the RF transmitter 23b. The processor 25 may also enable executing of applications that may be utilized by the RF communication device 20. For example, the processor 25 may execute applications that may enable displaying and/or interacting with content received via RF signals in the RF communication device 20.

The memory 27 may comprise suitable logic, circuitry, and/or code that may enable storage of data and/or other information utilized by the RF communication device 20. For example, the memory 27 may be utilized for storing processed data generated by the digital baseband processor 29 and/or the processor 25. The memory 27 may also be utilized to store information, such as configuration information, that may be utilized to control the operation of at least one block in the RF communication device 20. For example, the memory 27 may comprise information necessary to configure a PLL, such as the PLL 100 as described with respect to FIG. 2, residing in the RF receiver 23a and/or the RF transmitter 23b.

Figure 2:
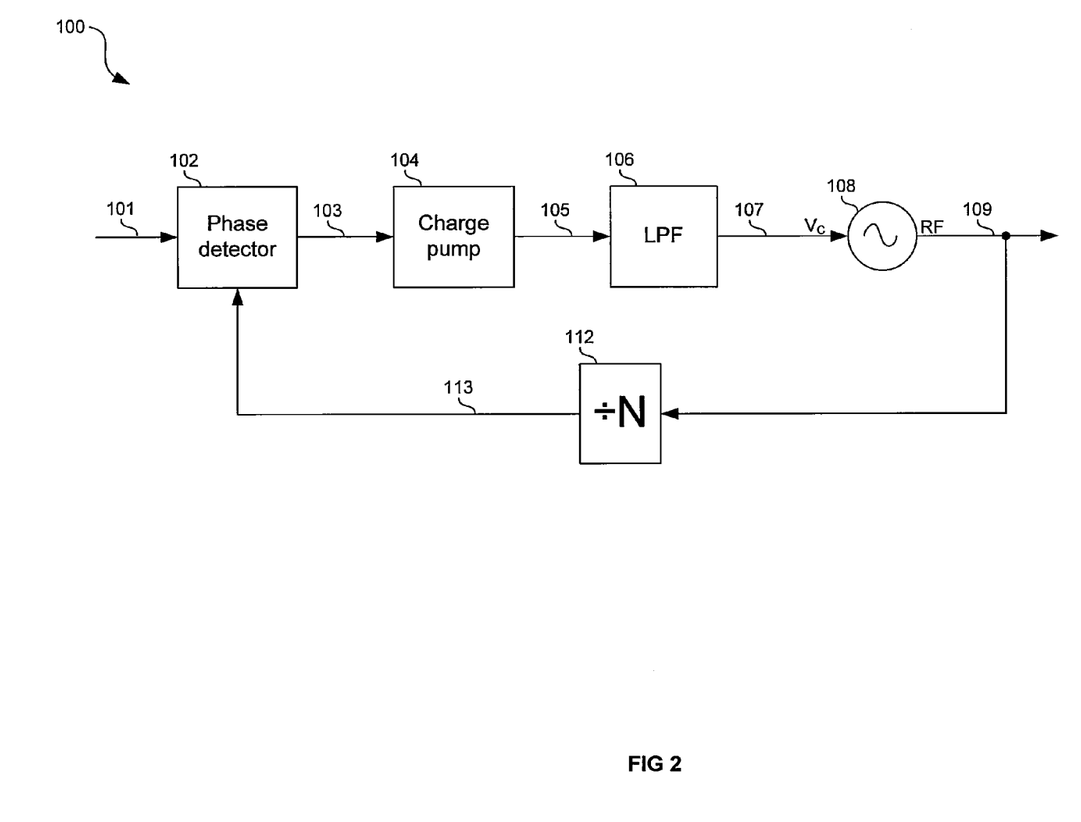
FIG. 2 is a block diagram of a PLL circuit, in connections with an embodiment of the invention.

FIG. 2 is a block diagram of a PLL circuit, in connection with an embodiment of the invention. Referring to FIG. 2 there is shown a phase detector 102, a charge pump 104, a low pass filter (LPF) 106, a voltage controlled oscillator (VCO) 108, and a frequency divider 112.

The phase detector 102 may comprise suitable logic, circuitry, and/or code that may enable generation of one or more signals based on a phase difference between two signals. In this regard, the signals 101 and 113 may be input to the phase detector 102 and the error signal 103 may be generated as an output of the phase detector 102. Accordingly, the signal 103 may be a current and/or voltage which depends on a phase difference between the signals 101 and 113.

The charge pump 104 may comprise suitable logic, circuitry, and/or code that may enable adjustment of a control voltage 107 of the VCO 108 based on the error signal 103. For example, the charge pump 104 may be enabled to increase (via the low pass filter 106) the voltage 107 when the error signal 103 indicates that signal 101 is lagging the signal 113. Similarly, the charge pump 104 may be enabled to decrease (via the low pass filter 106) the voltage 107 when the error signal 103 indicates that signal 101 is leading the signal 113.

The LPF 106 may comprise suitable logic, circuitry, and/or code that may enable low pass filtering of the error signal 103 so as to generate a VCO control voltage 107.

The VCO 108 may comprise suitable logic, circuitry, and/or code that may enable generating a signal 109 based on a control voltage 107. In this regard, the frequency of the signal 109 may be determined, at least in part, by the voltage 107. For example, the frequency of the VCO 108 may be determined by a LC tank circuit and thus the frequency of the VCO may be controlled by changing either the inductance or the capacitance of the tank circuit. In this regard, a voltage controlled varactor may be utilized to adjust the capacitance and thus the frequency.

The frequency divider 112 may comprise suitable logic, circuitry, and/or code for receiving a first, higher, frequency and outputting a second, lower, frequency. The scaling factor, N, may be determined based on one or more control signals from, for example, the processor 25 of FIG. 1. In this regard, N may be any integer or fractional scaling factor.

In operation, a phase difference between the signals 101 and 113 may generate a corresponding error signal 103. The charge pump 104 may then adjust (via the LPF 106) the control voltage 107 such that the VCO output frequency is adjusted. In this regard, the frequency of the VCO 108 may, for example, be determined by a LC tank circuit and capacitance of the tank circuit may comprise one or more varactors controlled by the control voltage 107.

Figure 3A:
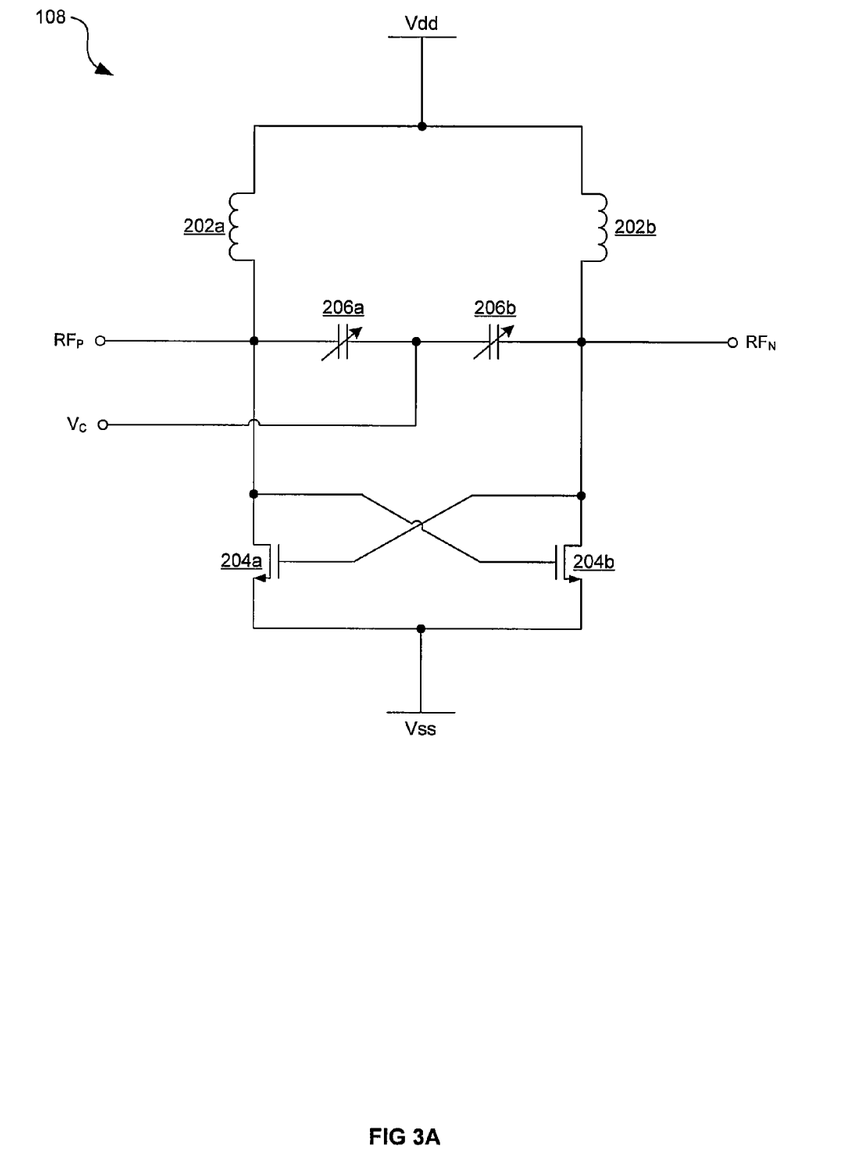
FIG. 3A is a diagram of an exemplary VCO, in connection with an embodiment of the invention.

FIG. 3A is a diagram of an exemplary VCO, in connection with an embodiment of the invention. Referring to FIG. 3A there is shown inductors 202a, 202b, transistors 204a, 204b, and varactors 206a, 206b.

The output node $RF_P$ may be communicatively coupled to a first terminal of the inductor 202a, an RF terminal of the varactor 206a, a drain of the transistor 204a, and a gate of the transistor 204b. The output node $RF_N$ may be communicatively coupled to a first terminal of the inductor 202b, an RF terminal of the varactor 206b, a drain of the transistor 204b, and a gate of the transistor 204a. In the exemplary embodiment shown, a source node of the transistors 204a and 204b may be communicatively coupled to a lower voltage, Vss. In various other embodiments of the invention, the source node of transistors 204a and 204b may be communicatively coupled to ground via, for example, a current source and/or a resistance. In the exemplary embodiment shown, a second terminal of the inductors 202a and 202b may be communicatively coupled to a higher voltage, VDD. In various other embodiments of the invention, the second terminal of the inductors 202a and 202b may be communicatively coupled to VDD via, for example, a current source and/or a resistance. A control terminal of the varactors 206a and 206b may be communicatively coupled to a control voltage, $V_C$.

In operation, the VCO 108 depicted in FIG. 3A may output a differential signal via the terminals $RF_P$ and $RF_N$. The frequency of the output, $f_{VCO}$, of the VCO 108 may be calculated using:

$$f_{VCO} = \frac{1}{2\pi\sqrt{L \cdot C}} \qquad \text{EQ. 1}$$

where L may be the total inductance of the inductors 202a and 202b and a parasitic inductance, and C may be the total capacitance of the oscillator tank circuit comprising varactors 206a and 206b and a parasitic capacitance. Thus, the control voltage $V_C$ may control the capacitance C and consequently the frequency $f_{VCO}$. However, the relationship between the control voltage and the capacitance, and thus the relationship between $V_C$ and $F_{VCO}$, may be non-linear, complicating the design and operation of the VCO 108. For example, the non-linearity may be problematic in instances that the VCO 108 is utilized in a system where part of the modulation information is passed through the VCO 108, such as a polar modulator. Accordingly, it may be desirable to replace the conventional varactors 206a and 206b with varactors that have a more linear relationship between the control voltage $V_C$ and the capacitance C.

Figure 3B:
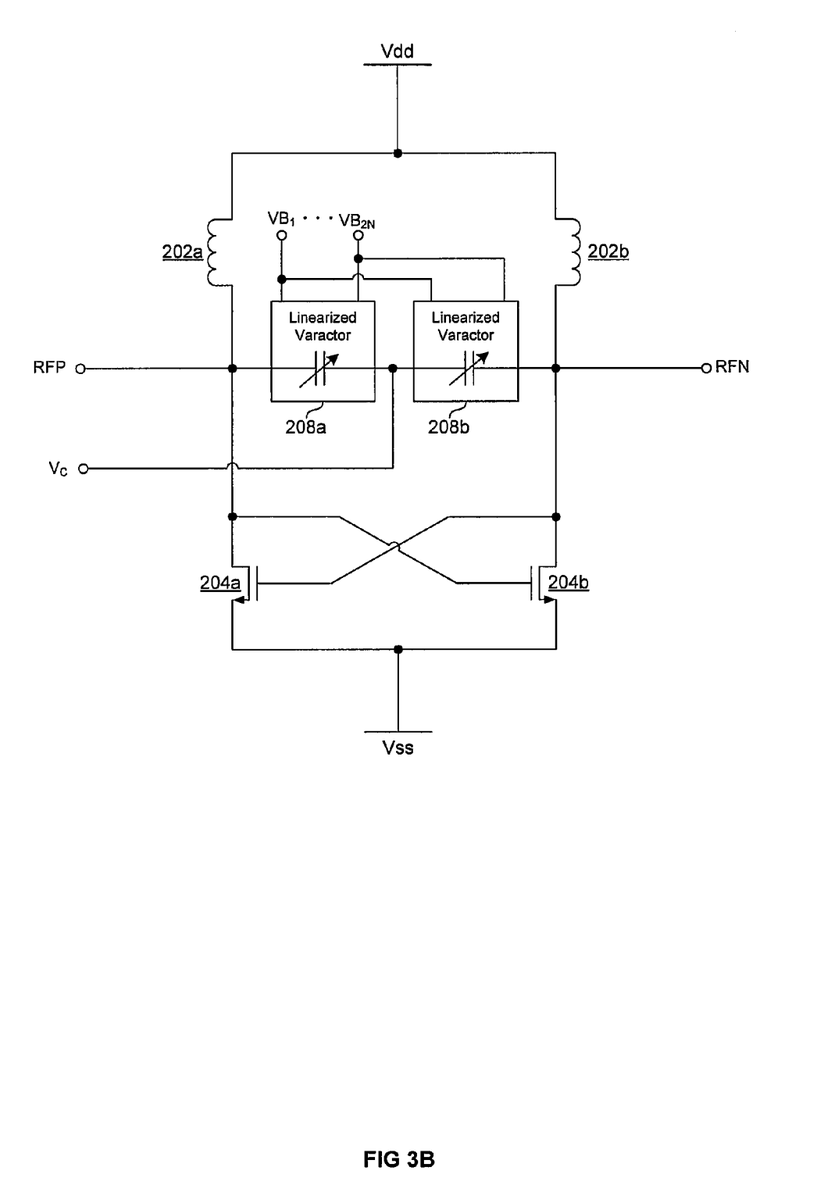

FIG. 3B is a diagram of an exemplary VCO utilizing linearized varactors, in accordance with an embodiment of the invention. Referring to FIG. 3B the varactors 206a and 206b of FIG. 3A are replaced by linearized varactors 208.

The linearized varactors 208a and 208b may each comprise an RF terminal, a control terminal $V_C$, and a plurality of bias terminals VB. In operation, the effective capacitance at the RF terminal may be affected by the control voltage $V_C$. Additionally, the number ('2N') of bias terminals and/or the values of the bias voltages ($VB_1$, $VB_2$, ..., $VB_{2N}$) may affect the relationship of control voltage to capacitance of the varactors 208a and 208b. Accordingly, aspects of the invention may enable determining the number of bias voltages and/or values for the bias voltages in order to achieve a desired linearity in the relationship between control voltage and capacitance.

Figure 4A:
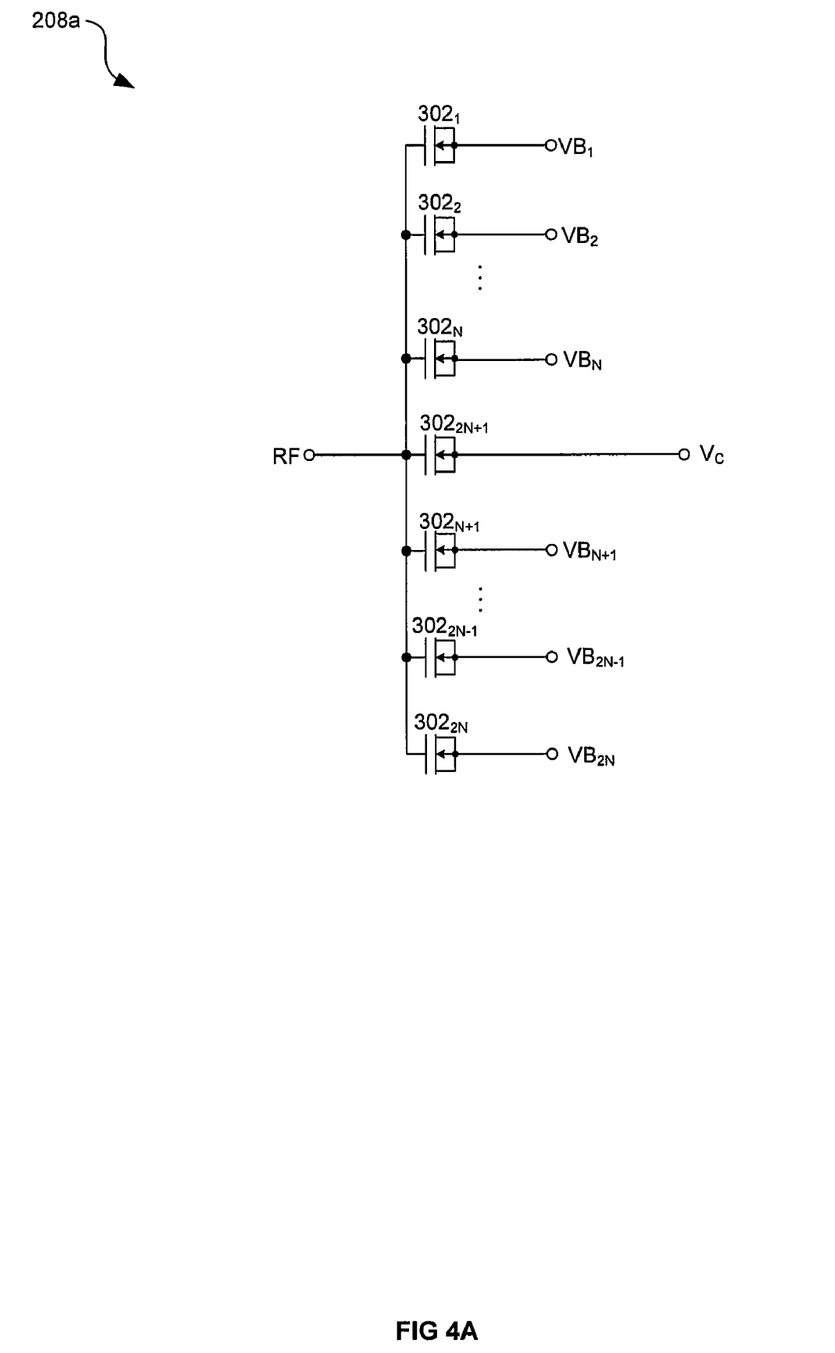
FIG. 4A is a diagram of an exemplary linearized varactor, in accordance with an embodiment of the invention.

FIG. 4A is a diagram of an exemplary linearized varactor, in accordance with an embodiment of the invention. Referring to FIG. 4A, there is shown a plurality ('2N') of unit varactors 302 each with an RF terminal communicatively coupled to a common node, via a polysilicon layer, for example, and each with a control terminal communicatively coupled to a voltage. In this regard, a control terminal of the unit varactor $302_{2N+1}$ may be communicatively coupled to a control voltage $V_C$, while a control terminal of each of the remaining unit varactors may be communicatively coupled to one of the plurality of bias voltages. In this regard, the control voltage $V_C$ may control a capacitance of the varactor 208a while the bias voltages $VB_1$ through $VB_{2N}$ may control a linearity of the varactor 208a. In an exemplary embodiment of the invention, the bias voltages $VB_1$ through $VB_N$ may be greater than the control voltage $V_C$ and the bias voltages $VB_{N+1}$ through $VB_{2N}$ may be less than the control voltage $V_C$. In various embodiments of the invention, the bias voltages $VB_1$ through $VB_{2N}$ may assume any value and each bias voltage may be the same as or different than one or more of the remaining bias voltages.

In an exemplary embodiment depicted, each unit varactor 302 may comprise a FET wherein the drain, the source, and the bulk of the FET may be communicatively coupled to form the first bias or control voltage terminal and the gate of the FET may be a second RF terminal. In another exemplary embodiment of the invention, each unit varactor 302 may comprise a diode, a p-n junction being one example of a diode, wherein the anode may be the first bias or control voltage terminal and the cathode may be the second RF terminal. In various other embodiments of the invention, the unit varactors may be realized in other ways without deviating from the scope of the invention. For example, each unit varactor 302 may comprise a p-type FET as opposed to the n-type FETs depicted in FIG. 4A. Additionally, in various embodiments of the invention the each of the unit varactors may be the same or may be different in terms of, for example, size and/or electrical characteristics.

Figure 4B:
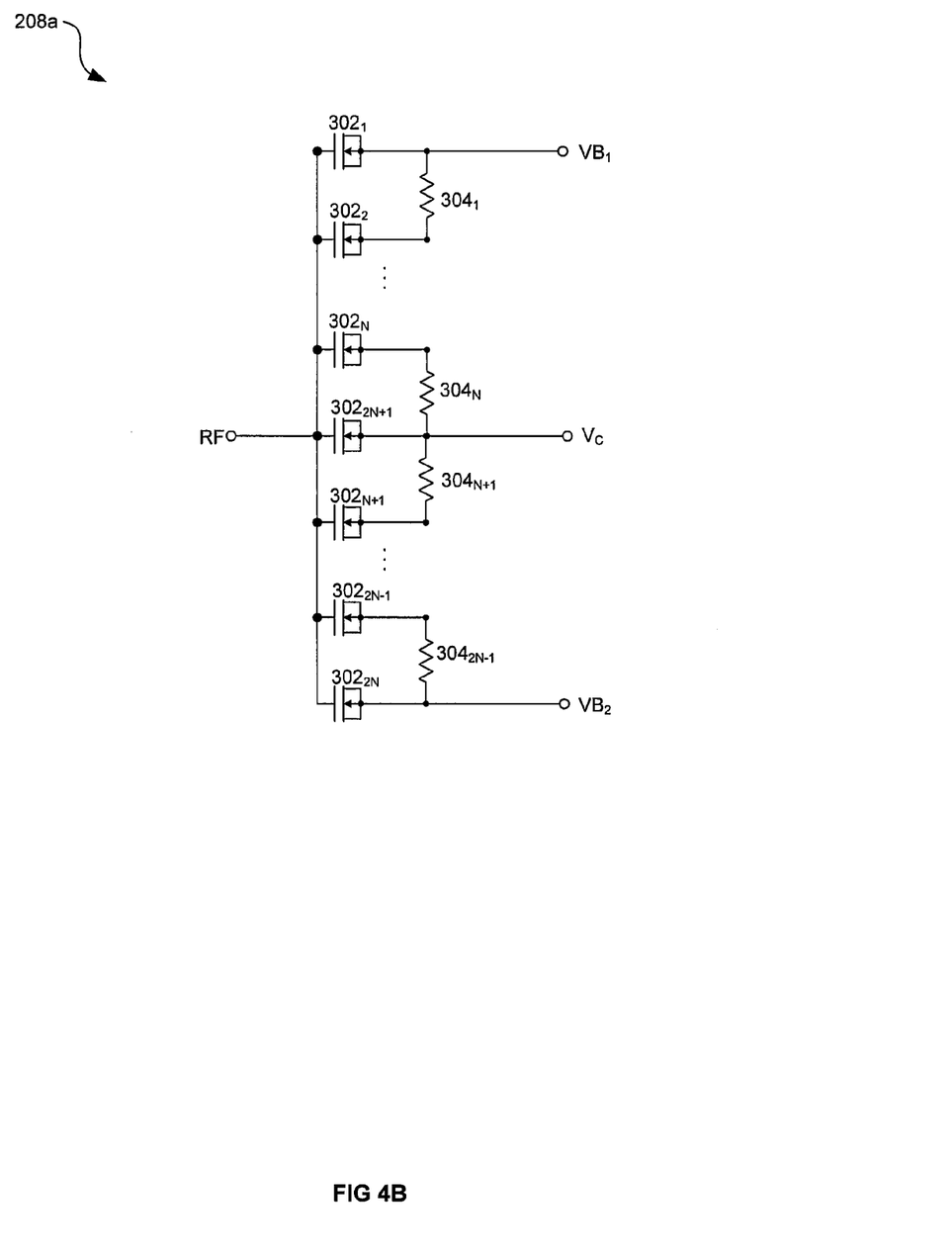
FIG. 4B is a diagram of another exemplary linearized varactor, in accordance with an embodiment of the invention.

FIG. 4B is a diagram of another exemplary linearized varactor, in accordance with an embodiment of the invention. Referring to FIG. 4B in contrast to the varactor 208a described with respect to FIG. 4A, the varactor 208a in FIG. 4B may utilize only two bias voltage terminals and may generate the remaining bias voltages via a resistor ladder comprising resistors $304_1$ through $304_{2N-1}$. Accordingly, linearity of the varactor 208a may be adjusted by controlling the bias voltages VB1 and VB2 while the effective capacitance at the RF terminal may be controlled via a control voltage $V_C$. In various embodiments of the invention, the resistors $304_1$ through $304_{2N-1}$ may each be the same resistance or may be varying resistances.

Figure 5A:
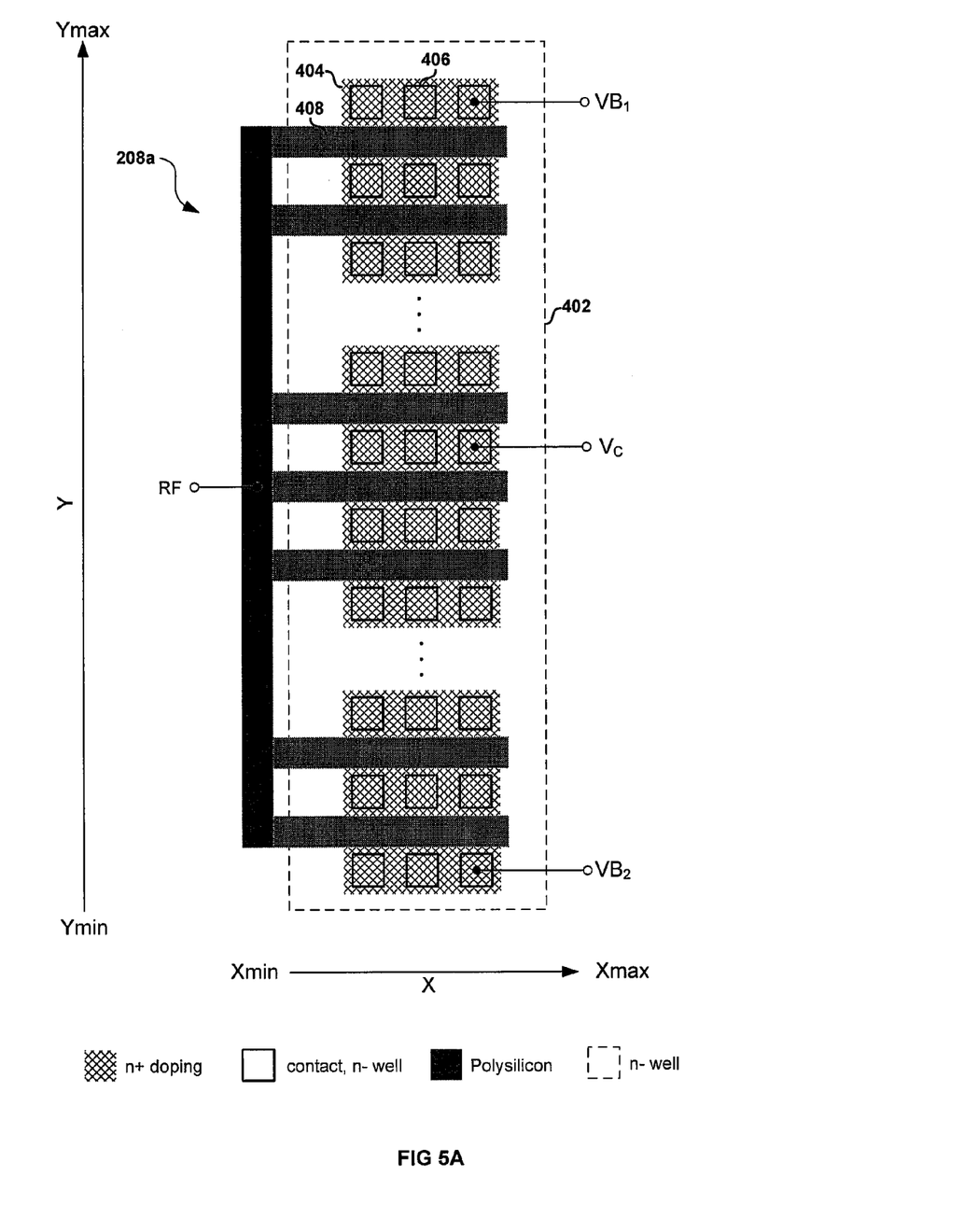
FIG. 5A depicts an exemplary layout for a linearized varactor in a CMOS process, in accordance with an embodiment of the invention.

FIG. 5A depicts an exemplary layout for a linearized varactor in a CMOS process, in accordance with an embodiment of the invention. Referring to FIG. 5A there is shown a layout of the exemplary varactor 208a depicted in FIG. 3B. In this regard, the varactor may comprise an n− well 402, a plurality of n+ regions 404, a plurality of contacts 406 which may couple the n+ regions to the n− well, and a polysilicon layer 408 which may comprise the RF terminal of the varactor 208a. An n− well may be lightly doped with an 'n' type dopant such as phosphorous, and an n+ well may be heavily doped with an 'n' type dopant such as phosphorous. In another exemplary embodiment of the invention, p-type FETs may be utilized and thus the well 402 may be a p− well and the n+ regions 404 may be p+ regions. A p− well may be lightly doped with a 'p' type dopant such as boron, and a p+ well may be heavily doped with a 'p' type dopant such as boron.

A Cartesian coordinate system is depicted in FIG. 5A for reference when describing the layout of varactor 308a. In this regard, a 'Y' axis extends vertically on the drawing sheet with "Ymin" at the edge of the n− well closest to the bottom margin of the drawing sheet and "Ymax" at the boundary of the n− well closest to the top margin of the drawing sheet. Similarly, an 'X' axis extends horizontally on the drawing sheet with "Xmin" at the edge of the n− well closest to the left margin of the drawing sheet and "Xmax" at the boundary of the n− well closest to the right margin of the drawing sheet.

In operation, a first bias voltage, $VB_1$, may be applied to a first bias point of the n− well at or near "Ymax", a second bias voltage, $VB_2$, may be applied to a second bias point of the n− well at or near "Ymin", and a control voltage may be applied at or near a midpoint between "Ymax" and "Ymin". In this manner a voltage differential of $|VB_1-V_C|$ may exist across a first portion of the n− well, and a voltage differential of $|VB_2-V_C|$ may exist across a remaining portion of the n− well. The n− well may be resistive by nature and thus if a thin ($\Delta X$) "slice" is taken in the 'Y' direction, then that slice may be modeled as a resistive ladder as depicted in FIG. 4B. Accordingly, each unit varactor 302 may effectively have a bias voltage applied to it which may depend on the unit varactor's location along the 'Y' axis.

Figure 5B:
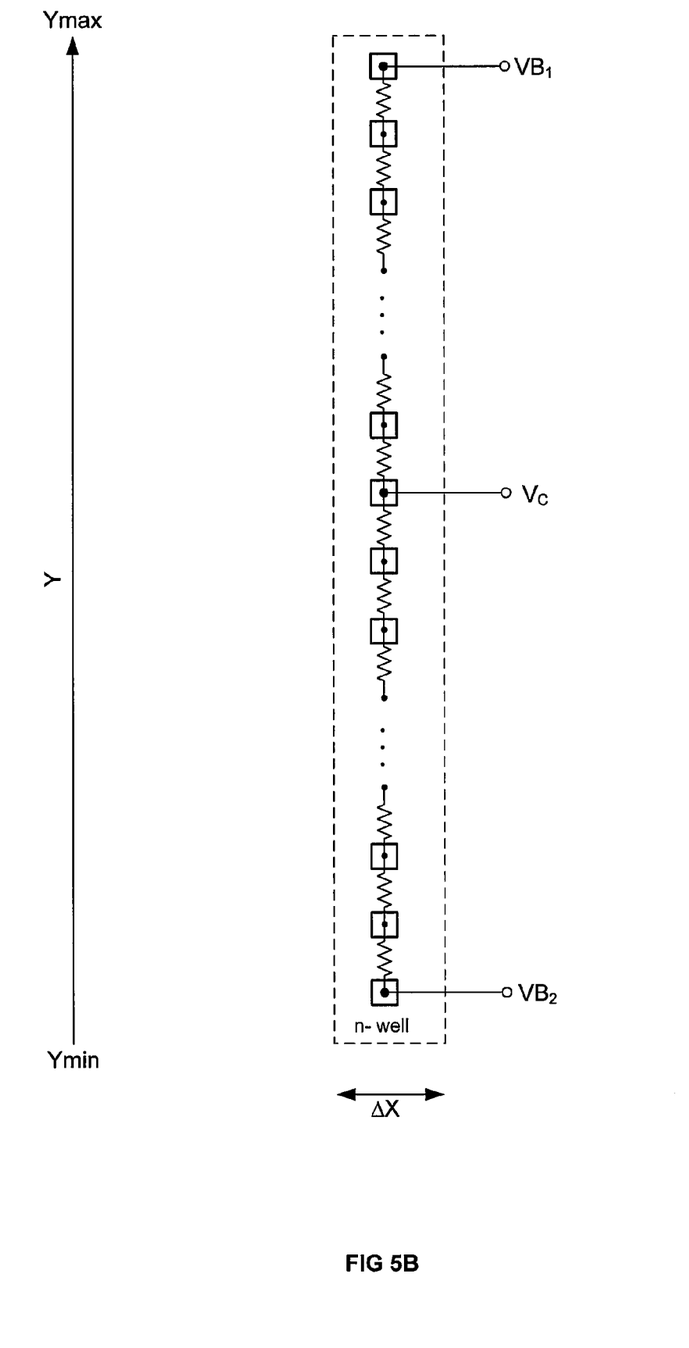
FIG. 5B illustrates modeling an n– well as a resistive ladder, in connection with an embodiment of the invention.

FIG. 5B illustrates modeling an n− well as a resistive ladder, in connection with an embodiment of the invention.

Referring to FIG. 5B the resistive nature of an exemplary n-well process is modeled by a resistor ladder. In the limit, the n-well may be modeled by a resistor ladder comprising an infinite number of resistors. Accordingly, there may be a continuous voltage gradient between $VB_1$ and $V_C$ and between $V_C$ and $VB_2$.

Figure 6A:
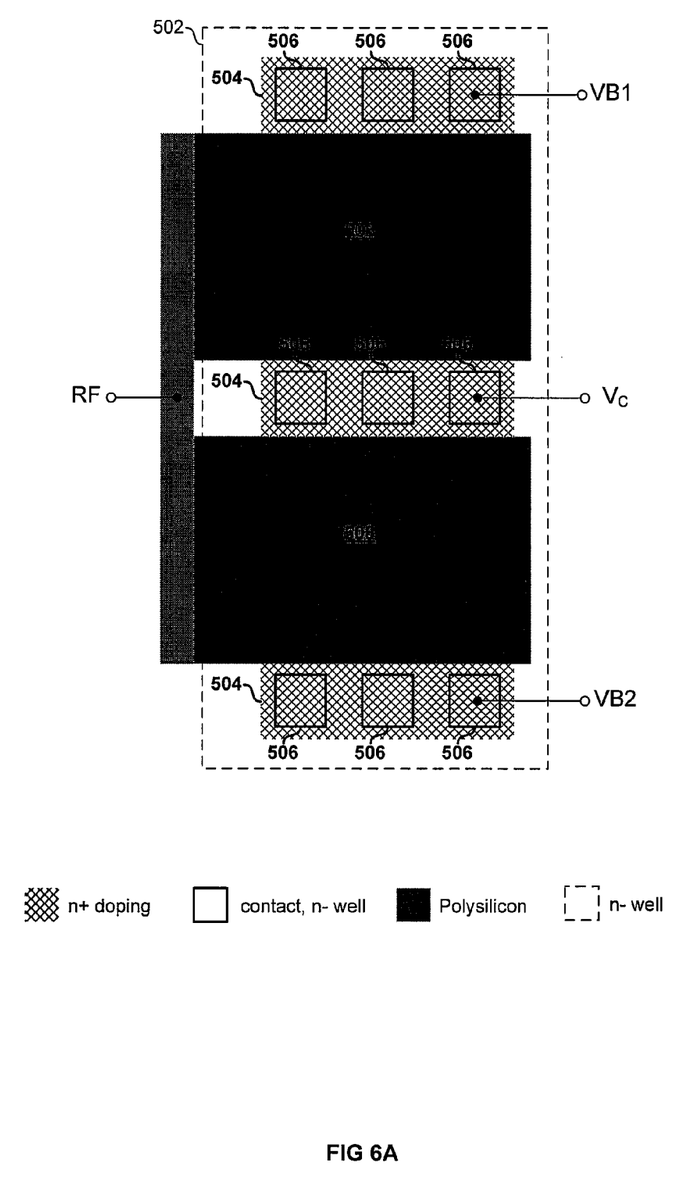
FIG. 6A is an exemplary layout for a linearized varactor in a CMOS process, in accordance with an embodiment of the invention.

FIG. 6A is an exemplary layout for a linearized varactor in a CMOS process, in accordance with an embodiment of the invention. The exemplary layout comprises two FETs each comprising a polysilicon gate 508 and n+ doped drain/source regions 504. The drain/source regions 504 may be coupled to an n- well 502 in which they reside via a plurality of contacts 506.

The varactor layout in FIG. 6A effectively expands on the concepts discussed with respect to FIGS. 5A and 5B. In effect, the layout of FIG. 5A may be viewed as comprising a discrete number of unit varactors 302, whereas the layout of FIG. 6A may be viewed as comprising an infinite number of unit varactors. In this manner, each thin ($\Delta Y$) "slice" in the 'X' direction may be viewed as a unit varactor coupled to a bias voltage which may be determined by the location of the "slice" along the 'Y' axis. In other words, increasing the 'Y' dimension of the layout in FIG. 6A may be viewed as analogous to increasing the number, '2N', of unit varactors 302 in the circuit of FIG. 4B.

Figure 6B:
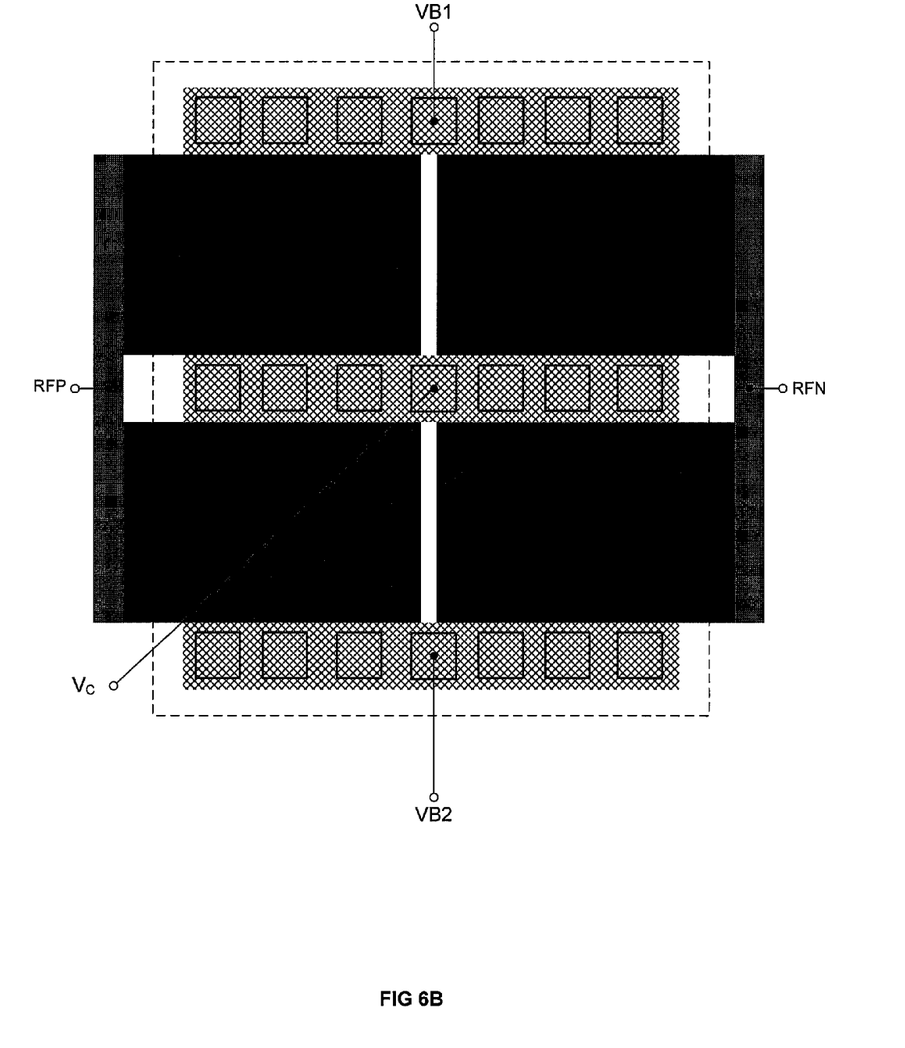
FIG. 6B is an exemplary layout for a pair of balanced (differential) linearized varactors, in accordance with an embodiment of the invention.

FIG. 6B is an exemplary layout for a pair of balanced (differential) linearized varactors, in accordance with an embodiment of the invention. In this regard, the layout depicted in FIG. 6B may be utilized in a VCO such as the VCO 108 of FIG. 2B.

Aspects of a method and system for varactor linearization are provided. In this regard, a relationship between control voltage and capacitance of a variable capacitor, such as 208a of FIG. 2, may be controlled utilizing a plurality of bias voltages, VB, communicatively coupled to a corresponding plurality of bias terminals of said variable capacitor. The variable capacitor may comprise a plurality of two-terminal unit varactors, such as the unit varactors 302 in FIG. 4A. A first terminal of each unit varactor may be coupled to an RF terminal of the variable capacitor, a second terminal of one of the unit varactors may be coupled to the control voltage, $V_C$, and a second terminal of each of the remaining unit varactors may be coupled to one of the bias voltages, VB. In an exemplary embodiment of the invention, the variable capacitor may comprise a control terminal, an RF terminal, and two of said bias terminals. The bias voltages may be generated via a resistor ladder, as, for example, illustrated in FIG. 4B, and/or via the resistive nature of a portion of semiconductor substrate, as, for example, illustrated in FIG. 5A and 5B. In an exemplary embodiment of the invention, a portion of the bias voltages may be less than the control voltage and another portion of the bias voltages may be greater than the bias voltage. The bias voltages may linearize the relationship between the control voltage and the capacitance.

Another embodiment of the invention may provide a machine-readable storage, having stored thereon, a computer program having at least one code section executable by a machine, thereby causing the machine to perform the steps as described herein for varactor linearization.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
for a voltage controlled oscillator (VCO) comprising a variable capacitor, controlling linearity of a relationship between a control voltage of said VCO and a capacitance of said variable capacitor by controlling a plurality of bias voltages communicatively coupled to a corresponding plurality of bias terminals of said variable capacitor, wherein:
    said control voltage is applied to a terminal of said variable capacitor;
    said control voltage establishes an upper boundary for a first portion of said plurality of bias voltages;
    said control voltage establishes a lower boundary for a second portion of said plurality of bias voltages;
    said plurality of bias voltages are generated via a resistive ladder;
    a first endpoint of said resistive ladder is coupled to a first supply voltage;
    a second endpoint of said resistive ladder is coupled to a second supply voltage; and
    said control voltage is applied to an interior point of said resistive ladder.

2. The method according to claim 1, wherein:
said variable capacitor comprises a plurality of two-terminal unit varactors; and
a first terminal of each of said unit varactors is communicatively coupled to an RF terminal of said variable capacitor.

3. The method according to claim 1, wherein said variable capacitor comprises a control terminal, an RF terminal, and two of said bias terminals.

4. The method according to claim 1, wherein:
said first endpoint corresponds to a first bias point in a doped well of a semiconductor substrate;
said second endpoint corresponds to a second bias point in said doped well of said semiconductor substrate; and
said interior point corresponds to a third bias point in said doped well of said semiconductor substrate, such that said resistive ladder is realized via a resistive nature of said doped well of said semiconductor substrate.

5. The method according to claim 4, wherein each of said first, second, and third bias points is one of a plurality of conductive contacts in said doped well in said semiconductor substrate.

6. The method according to claim 5, wherein each of said first, second, and third contacts is at a different point along a length of said doped well.

7. The method according to claim 6, wherein said first, second, and third contacts are arranged linearly.

8. A system comprising:
one or more circuits comprising a voltage controlled oscillator (VCO), said VCO comprising a variable capacitor having a plurality of bias terminals, wherein:
said one or more circuits enable controlling linearity of a relationship between a control voltage of said VCO and capacitance of said variable capacitor by controlling a plurality of bias voltages communicatively coupled to said plurality of bias terminals of said variable capacitor;
said control voltage is applied to a terminal of said variable capacitor;
said control voltage establishes an upper boundary for a first portion of said plurality of bias voltages;
said control voltage establishes a lower boundary for a second portion of said plurality of bias voltages;
said plurality of bias voltages are generated via a resistive ladder;
a first endpoint of said resistive ladder is coupled to a first supply voltage;
a second endpoint of said resistive ladder is coupled to a second supply voltage; and
said control voltage is applied to an interior point of said resistive ladder.

9. The system according to claim 8, wherein:
said variable capacitor comprises a plurality of two-terminal unit varactors; and
a first terminal of each of said unit varactors is communicatively coupled to an RF terminal of said variable capacitor.

10. The system according to claim 8, wherein said variable capacitor comprises a control terminal, an RF terminal, and two of said bias terminals.

11. The system according to claim 8, wherein:
said one or more circuits are fabricated on a semiconductor substrate;
said first endpoint corresponds to a first bias point in a doped well of said semiconductor substrate;
said second endpoint corresponds to a second bias point in said doped well of said semiconductor substrate; and
said interior point corresponds to a third bias point in said doped well of said semiconductor substrate, such that said resistive ladder is realized via a resistive nature of said doped well in said semiconductor substrate.

12. The system according to claim 11, wherein each of said first, second, and third bias points is one of a plurality of conductive contacts in said doped well in said semiconductor substrate.

13. The system according to claim 12, wherein each of said first, second, and third contacts is at a different point along a length of said doped well.

14. The system according to claim 13, wherein said first, second, and third contacts are arranged linearly.

* * * * *